(12) United States Patent
Hansen et al.

(10) Patent No.: US 6,304,368 B1
(45) Date of Patent: *Oct. 16, 2001

(54) BROADBAND OPTICAL AMPLIFICATION SYSTEM

(75) Inventors: Per Bang Hansen, Rumson; Torben N. Nielsen, Monmouth Beack; Andrew John Stentz, Clinton, all of NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,279

(22) Filed: Jan. 15, 1999

(51) Int. Cl.[7] .............................. H04J 14/02; H01S 3/30
(52) U.S. Cl. ................ 359/334; 359/134; 359/341.32; 372/3
(58) Field of Search .................. 359/124, 134, 359/334, 341, 32; 372/3

(56) References Cited

U.S. PATENT DOCUMENTS

| | | | |
|---|---|---|---|
| 3,346,741 | * 10/1967 | Mayer et al. | 372/3 |
| 4,922,481 | * 5/1990 | Hicks | 359/334 |
| 4,923,291 | * 5/1990 | Edagawa et al. | 359/134 |
| 5,452,116 | * 9/1995 | Kirkby et al. | 359/124 |
| 5,623,508 | 4/1997 | Grubb et al. | 372/3 |
| 5,959,750 | * 9/1999 | Eskildsen et al. | 359/334 |

OTHER PUBLICATIONS

Nielsen et al, IEEE Photaries Techn. Lett., vol. 10, #10, 1492–4; abstract and herewith, Oct. 1998.*
Hansen et al, OSA Trends in optics photon., vol. 5, pp. 12–15. abstract only, Jul. 13, 1996.*
Eschildsen et al, OSA Trends in Optics Photon vol. 5, pp. 306–8; abstract only herewith, Jul. 13, 1996.*
Stentz et al, OFC '96, Opt. Fiber Commun., vol. 2, pp. 391–4, Mar. 1, 1996.*
Stenz et al, OFC '96, Opt. Fiber Communic., vol. 2, pp. 16–17, Mar. 1, 1996.*
Hansen, P.B. and Eskildsen, L., "Remote Amplification in Repeaterless Transmission Systems", Optical Fiber Technology, 3, 221–237 (1997).
Stentz, A.J., "The Revival of Raman Amplifiers" Proceedings of the 1996, 9th Annual Meeting of IEEE Lasers and Electro–Optics Society, LEOS'96. Part 1 (of2), 1996.
Riishoj, J, Nielsen, T.N., and Gliese, U., "A 4 Gb/s 2–Level to 2 Gsymbol/s 4–Level Converter GaAs IC Semiconductor Optical Amplifier QPSK Modulators", IEE Journal of Solid–State Circuits, vol. 29, No. 10, pp. 1277–1281, Oct. 1994.

(List continued on next page.)

*Primary Examiner*—Nelson Moskowitz
(74) *Attorney, Agent, or Firm*—Schnader Harrison Segal & Lewis LLP

(57) ABSTRACT

The present invention is directed to an optical communication system and optical signal amplifier for amplifying said optical signal having at least a first and a second wavelength as it propagates therethrough. The optical signal amplifier includes an input port; an output port; an optical medium, wherein a portion of the optical medium comprises a plurality of optical paths corresponding to the first and second wavelengths of the optical signal; a light radiation generator capable of coupling light radiation of a plurality of light radiation wavelengths related to the first and second wavelengths of the optical signal into each of the optical paths, whereby the first and said second wavelengths are amplified by Raman amplification; and an optical combiner for recombining the first and second wavelengths of the optical signal to generate the amplified optical signal.

42 Claims, 4 Drawing Sheets

OTHER PUBLICATIONS

Hansen, et al., "Repetition–Rate Dependence of Gain Compression in InGaAsP Optical Amplifiers Using Picosecond Optical Pulses", IEE Journal of Quantum Electronics, vol. 25, No. 12, pp. 2611–2620, Dec. 1989.

Joergensen et al., "All–Optical Wavelength Conversion at Bit Rates Above 10Gb/s Using Semiconductor Optical Amplifiers", IEEE Journal of Selected Topics in Quantum Electronics, vol. 3, No. 5, pp. 1168–1180, Oct. 1997.

Hansen, et al., "442km repeaterless transmission in 10Gbit/s system experiment," Electronics Letters, vol. 32, No. 11, pp. 1018–1019, May 23rd, 1996.

Eskilden, et al., "Single fibre repeaterless transmission over 490km at 2.488Gbit/s using a remote preamplifier and dispersion compensation", Electronics Letters, vol. 32, No. 18, pp. 1696–1697, Aug. 29th, 1996.

Hansen et al., "High sensitivity 1.3um optically preamplified receiver using Raman amplification", Electronics Letters, vol. 32, No. 23, pp. 2164–2165, Nov. 7th, 1996.

Hansen et al., "5.29km unrepeatered transmission at 2.488GBit/s using dispersion compensation, forward error correction, and remote post–and pre–amplifiers by diode–pumped Raman lasers", Electronics Letters, vol. 31, No. 17, 1460–1461, Aug. 17th, 1995.

Eskildsen, et al., "Remote postamplifiers in repeaterless transmission systems," Electronic Letters, vol. 31, No. 14, pp. 1163–1164, Jul. 6th, 1995.

Hansen, et al., "2.488Gbit/s unrepeatered transmission over 423km employing remotely pumped post–and preamplifiers", Electronics Letters, vol. 31, No. 6, pp. 466–467, Mar. 16th, 1995.

Heismann et al., "Automatic polarisation demultiplexer for polarisation–multiplexed transmission systems", Electronics Letters, vol. 29, No. 22,1965–1966, Oct. 28th, 1993.

Hansen, et al., "Optical Demultiplexing at 6 Gb/s Using a Semiconductor Laser Amplifier as an Optical Gate", IEEE Transactions Photonics Technology Letters, vol. 3, No. 11, pp. 1018–1020, Nov. 1991.

Hansen, et al., "374–km Transmission in a 2.5–Gb/s Repeaterless System Employing a Remotely Pumped Erbium–Doped Fiber Amplifier", IEEE Photonics Technology Letters, vol. 7, No. 5, pp. 588–590, May 1995.

Silva, et al., "Remotely Pumped Erbium–Doped Fiber Amplifiers for Repeaterless Submarine Systems", IEEE Photonics Technology Letters, vol. 7, No. 9, pp. 1081–1083, Sep. 1995.

Hansen, et al., "Unrepeatered WDM Transmission Experiment with 8 Channels of 8 Gb/s Over 352 km", IEEE Photonics Technology Letters, vol. 8, No. 8,pp. 1082–1084, Aug. 1996.

Hansen, et al., "Capacity Upgrades of Transmission Systems by Raman Amplification", IEEE Photonics Technology Letters, vol. 9, No. 2, pp. 262–264, Feb. 1997.

Danielsen, et al., "All Optical Wavelength Conversion Schemes for Increased Input Power Dynamic Range", IEEE Photonics Technology Letters, vol. 10, No. 1, pp. 60–62, Jan. 1998.

Hansen, et al., "Rayleigh Scattering Limitations in Distributed Raman Pre–Amplifiers", IEEE Photonics Technology Letters, vol. 10, No. 1, pp. 159–161, Jan. 1998.

Stentz, A.J., "Applications of Raman Lasers and Amplifiers in Fiber Communication Systems", SPIE, vol. 3263, pp. 91–94, 1998.

Lassen at al., "Crosstalk in 1.5 um InGaAsP Optical Amplifiers", Journal of Lightwave Technology, vol. 6, No. 10, pp. 1559–1565, Oct. 1988.

Grubb, et al., "Fiber Raman Lasers emit at many wavelengths", Laser Focus World, vol. 32, No. 2, pp. 24–28, Feb. 1996.

Stentz, et al., "Progress on Raman amplifiers ", OFC Technical Digest, vol. 6, FA, pp. 343, 1997.

Hansen, et al., "Loss compensation in dispersion compensating fiber modules by Raman amplification", OFC Technical Digest, pp. 20–21, 1998.

Adams et al., "SYS Supression Using a multichannel Tunable Laser with Data–Encoding Capability", Fiber and Integrated Opics, 17:311–316, 1998.

Hansen et al., "Rayleigh scattering limitations in distributed Raman pre–amplifiers", Optical Fiber Communications, vol. 6, FA2, pp. 343–345, 1997.

Hansen et al., "Loss compensation in dispersion compensating fiber modules by Raman amplifications", OFC Technical Digest, pp. 20–21, 1998.

* cited by examiner

BROADBAND OPTICAL AMPLIFICATION SYSTEM

BACKGROUND OF THE INVENTION

1. Field of the Invention

The present invention relates to a system for broadband optical amplification, particularly to a dual window Raman amplifier, and more particularly to a dual window, bi-directional Raman amplifier.

2. Description of the Prior Art

Currently, dense wavelength division multiplexing (DWDM) technology is being used to dramatically improve high capacity optical transmission systems. Systems are now being developed that will allow transmission of 64 (and beyond) WDM channels on a single fiber. This represents a dramatic increase from existing 16 channel systems.

Broadband optical amplifiers will be essential components in such systems and will need to provide high enough bandwidth, low enough noise, and sufficient power to minimize channel crosstalk and degradation due to fiber nonlinearities. In addition, it is important that the amplifiers provide a graceful upgrade path for the customer. It is very likely that customers initially will only require a fraction of the maximum system capacity, while maintaining the option to expand the capacity at a later point. More specifically, they will require amplifiers that can be upgraded (as opposed to being replaced) to the full system capacity at a small additional cost.

Recently, it has been demonstrated that the bandwidth of erbium doped fiber amplifiers (operating around 1550 nm) can be expanded to more than 80 nm using a split band technique. Such amplifiers would easily accommodate 100 wavelength channels at 100 GHz spacing. However, current systems where the wavelength channels occupy a large contiguous bandwidth have the significant disadvantage that they suffer substantial penalties due to stimulated Raman scattering. These penalties occur because the lower wavelength channels loose power (and thereby signal to noise ratio) as they pump the upper wavelength channels. Also, an erbium doped fiber amplifier with the full 80 nm bandwidth may not necessarily provide the customer with the desired upgrade path.

SUMMARY OF THE INVENTION

Thus an optical communication system is needed which can achieve the benefits of broadband DWDM, while reducing penalties due to stimulated Raman scattering. Accordingly, the present invention is directed to a system of amplification in which signal gain is provided in independent wavelength windows.

The present invention includes an optical communication system and optical signal amplifier for amplifying an optical signal having at least a first and a second wavelength as it propagates therethrough. The optical signal amplifier includes an input port; an output port; an optical medium, wherein a portion of the optical medium comprises a plurality of optical paths corresponding to the first and second wavelengths of the optical signal; a light radiation generator capable of coupling light radiation of a plurality of light radiation wavelengths related to the first and second wavelengths of the optical signal into each of the optical paths, whereby the first and said second wavelengths are amplified by Raman amplification; and an optical combiner for recombining the first and second wavelengths of the optical signal to generate the amplified optical signal.

The present invention may further include an optical signal direction selective device disposed in each of the optical paths for reducing scattering of the optical signal, and a bypass medium for allowing the light radiation to bypass the optical signal direction selective device. The light radiation generator may include a light pump, a light isolator, a light cavity and gratings, at least one wavelength division multiplexor, and a plurality of light couplers. The present invention may also include gain flattening components, dispersion compensating components, an optical signal attenuator, and an optical bypass switch for controllably removing one or more of the first or second wavelengths from the optical signal. The present invention may also be configured for bidirectional operation.

DETAILED DESCRIPTION

The present invention will be understood more fully from the detailed description given below and from accompanying drawings of preferred embodiments of the invention, which, however, should not be taken to limit the invention to a specific embodiment, but are for explanation and understanding only.

To enable amplification of numerous WDM channels, while keeping the contiguous bandwidth low, an amplifier is needed that provides gain in each wavelength window (e.g. the 1300 nm window as well as the 1550 nm window). This would effectively reduce penalties from stimulated Raman scattering in the transmission fiber as the channels are divided into two independent windows separated by more than the Raman gain bandwidth. The amplifier of the present invention is furthermore based on a topology that initially can be configured to operate in only one of the windows, and be upgraded to operate in both windows against a very modest investment.

Figure 1:
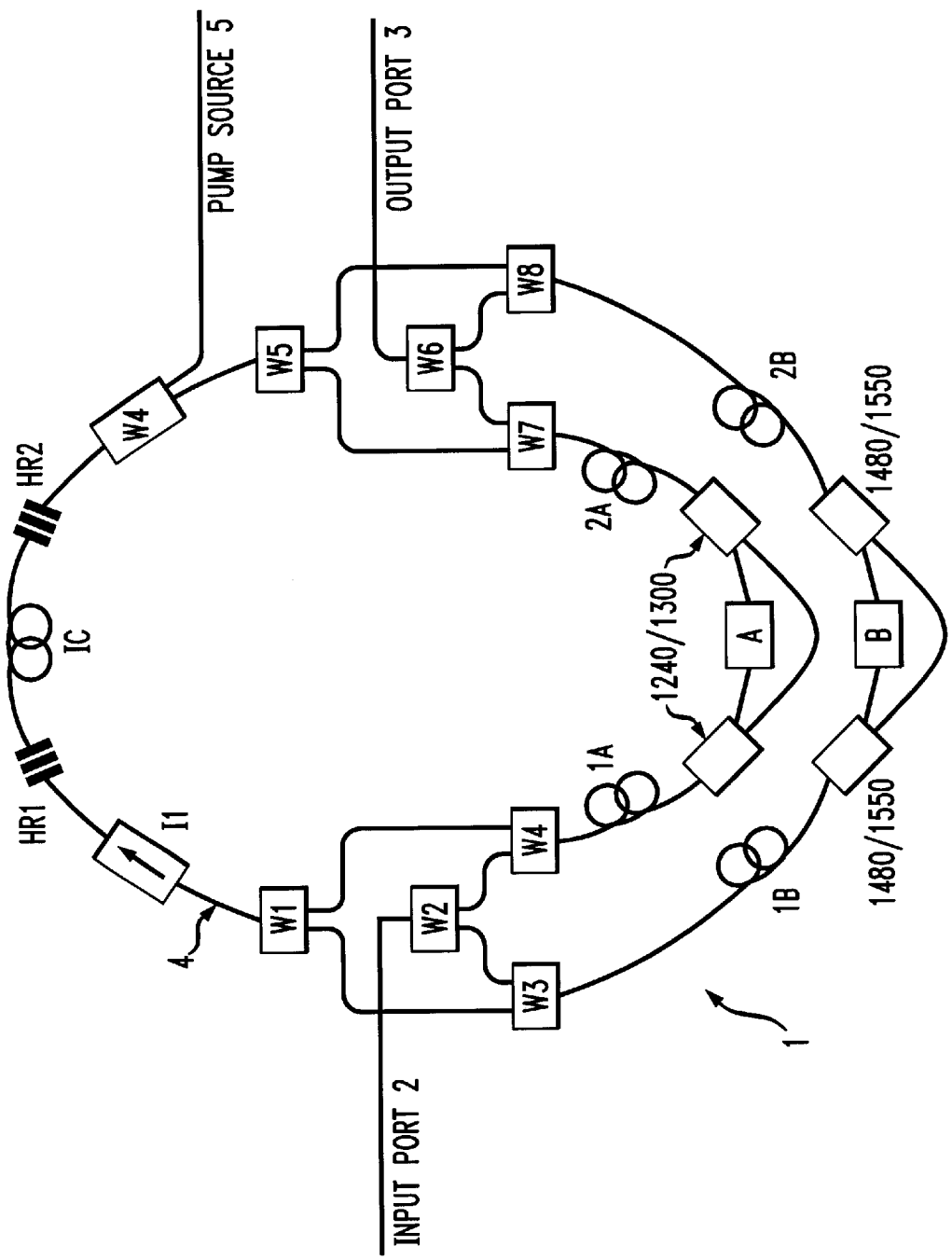
FIG. 1 is a schematic illustrating the components and configuration of a preferred embodiment of the present invention.

The amplifier of the present invention is preferably a Raman amplifier, as shown in FIG. 1. Amplifiers based on Raman gain are highly advantageous because the gain window can be tailored to any wavelength region and that multiple gain windows can be provided from the same light pump source as long as the gain windows are separated by an integer multiple of the Stoke shift. The amplifier shown herein provides gain in the 1300 nm window and the 1550 nm window (corresponding to 4 Stoke shifts separation) but other combinations are certainly within the scope of the invention.

Raman amplifiers are known generally in the art. One example is disclosed in detail in is U.S. Pat. Nos. 5,623,508 and 6,673,280 to Grubb, which are hereby incorporated by reference herein in their entirety. The amplifier of the present invention, however, provides significant advantages over the conventional Raman amplifiers of the prior art through the use of an optical path for each wavelength of the optical signal to be amplified (as described in more detail below).

As shown in FIG. 1, Amplifier 1 contains Input Port 2, Output Port 3, and Optical Medium 4. Optical Medium 4 may comprise any number of optical media, which are well known in the art, such as optical fibers, particularly silica glass fiber, and other optical wave guides. A portion of Optical Medium 4, is divided into two optical paths. Each of the optical paths includes optical fiber for achieving Raman gain. These are shown in FIG. 1 as Optical Fibers 1A, 1B, 2A, and 2B.

The 1300 nm path provides Raman gain for the 1300 nm portion of the optical signal inputted at Input Port 2, and the 1550 nm path amplifies the 1550 nm portion of the optical signal. The inputted optical signal may divided into the optical two paths through the use of a light divider, well know to those of skill in the art, such as Wave Division Multiplexor (WDM) Coupler W2. Likewise, the wavelengths of the optical signal can be combined after amplification in a conventional manner when passed to Output Port 3, such as through the use of Wave Division Multiplexor (WDM) Coupler W6. In this way, both the 1300 nm and 1550 nm input signals are counter pumped, as further described below.

The present invention may also include a light radiation generator, which provides light radiation to the optical medium in a direction opposite to the direction of propagation of the optical signal. The light radiation introduced is preferably of a plurality of wavelengths in relation to the wavelengths of the optical signal. Such systems are well known in the art.

For example, as shown in FIG. 1, a cascaded Raman laser may be used that generates 1240 nm and 1480 nm light to provide Raman gain for the 1300 nm and 1550 nm input signals, respectively. The 1240 and 1480 nm lights are coupled to the appropriate paths in the lower part of the ring by of Wave Division Multiplexor (WDM) Coupler W5 while of Wave Division Multiplexor (WDM) Coupler W1 re-injects unused pump light from the portion of the optical medium containing the separate optical paths.

The light radiation generator may generate the 1240 and 1480 nm lights by using a light pump, such as a single 1117 nm pump source, shown as Pump Source 5 in FIG. 1. The light from Pump Source 5 is injected into the ring through coupler W9. W9 serves as a 1117/1240 nm coupler as well as a 1117/1480 nm coupler. The 1117 nm light is initially converted into 1240 nm light by the Raman gain in fiber 1C. The 1240 nm light is lasing clockwise around the ring in a direction opposing the direction of propagation of the optical signal through the inclusion of Light Direction Selective Device I1, and provides the Raman gain for the 1300 nm portion of the input signal. The Raman gain in fiber 1C, together with the light cavity consisting of the 1305–1365–1420 HR gratings comprise a wave converter to convert part of the lasing 1240 nm light into 1480 nm light. The 1480 nm light is also lasing clockwise around the ring, but is coupled to the 1550 nm path where it provides the Raman gain for the 1550 nm portion of the optical signal.

The 1300 nm and the 1550 nm paths may also be divided into two stages. Components "A" and "B" separating the two stages may include a signal direction selective device to minimize Rayleigh scattering noise in the optical signal. In addition, the components may include gain flattening components and dispersion compensating fiber so that the dispersion map can be optimized independently for each wavelength window. An attentuator may also be included for gain control. The WDM couplers on each side of "A" and "B" provide a bypass medium for the 1240 nm and 1480 nm light from the light radiation generator.

The direction selective device used in the preferred embodiment of the present invention may, of course, comprise a number of wavelength selection devices well known in the art, such as light isolators and bypass medium, or optical circulators. Examples of these devices are shown in FIGS. 3(a) and 3(b), and FIG. 4(a) and 4(b).

Figure 3A:
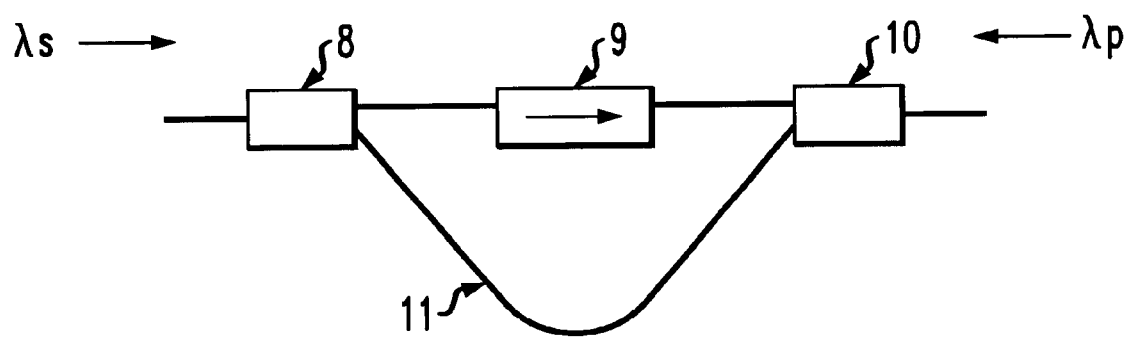
FIGS. 3(a) is a schematic illustrating the components and configuration of preferred embodiment of a light isolator of the present invention.

As shown in FIG. 3(a), the optical signal, $\lambda s$, enters the direction selective device through WDM 8, and passes through Light Isolator 9, to WDM 10. Simultaneously, light, $\lambda p$, enters the direction selective device through WDM 10. Light $\lambda p$ is generated by passing light from Light Pump 5 through HR gratings to select the appropriate wavelength, as previously described. Light Isolator 9 substantially blocks light $\lambda p$ from passing through to WDM 9. Any transmitted light is instead passed through Bypass Medium 11, which may comprise, for example, a silica glass optical fiber, and similar light guides.

Figure 3B:
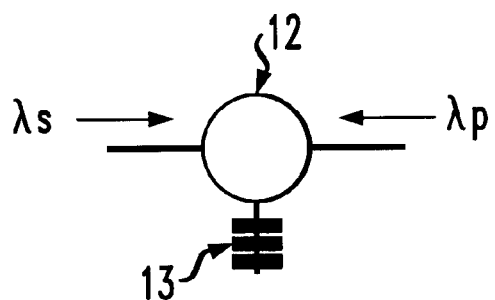
FIGS. 3(b) is a schematic illustrating the components and configuration of preferred embodiment of a light circulator of the present invention.

An alternate embodiment is shown in FIG. 3(b). As shown in FIG. 3(b), the optical signal, $\lambda s$ passes through Light Circulator 12. In this configuration, Light Circulator 12 is a closed circulator. Light, $\lambda p$, enters the direction selective device from the opposite direction, and is reflected from Bragg grating 13 allowing passage of light $\lambda p$ from right to left around Circulator 12. Using a closed circulator in this manner in the present invention has the significant advantage that the Bragg grating helps to stabilize light $\lambda p$ as it lases around the amplifier.

Figure 4A:
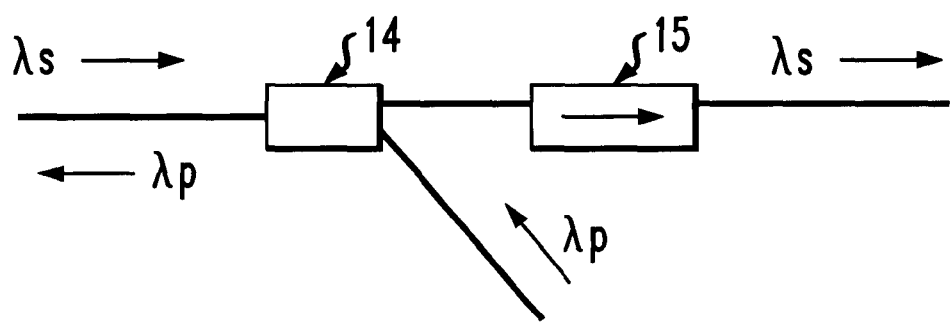
FIGS. 4(a) is a schematic illustrating the components and configuration of a second preferred embodiment of a light isolator of the present invention.
Figure 4B:
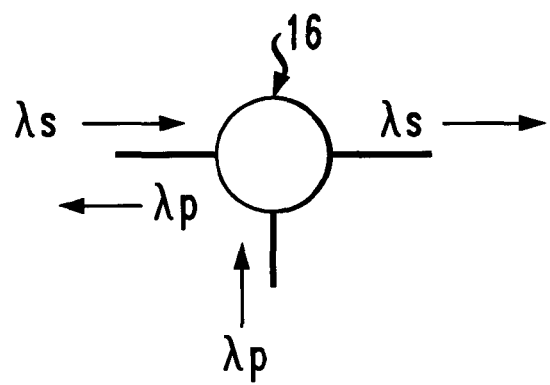
FIGS. 4(b) is a schematic illustrating the components and configuration of a second preferred embodiment of a light circulator of the present invention.

As shown in FIG. 4(a), the optical signal, $\lambda s$, enters the direction selective device through WDM 14, and passes through Light Isolator 15. Simultaneously, the light, $\lambda p$, enters WDM 14 as shown. An alternate embodiment is shown in FIG. 4(b). As shown in FIG. 4(b), the optical signal, $\lambda s$ passes through Light Circulator 16. In this configuration, Light Circulator 16 is an open circulator. The light, $\lambda p$, enters Light Circulator 16 as shown.

The multi-band amplifier of the present invention, such as the dual band amplifier illustrated in FIG. 1, can be used as a single wavelength 1300 nm or 1550 nm amplifier by including a WDM coupler as a conventional bypass switch to bypass the 1550 nm path or 1300 nm path. Moreover, upgrading from a single window amplifier to a dual window amplifier system may be accomplished by simply adding the missing components. The amplifier can be upgraded from a single 1300 nm window amplifier to a dual window amplifier without any interruption of the 1300 nm window. However, upgrading from a single 1550 nm window to a dual window system will require interruption of the 1550 nm window, since the 1240 nm pump light (Pump Source 5 in FIG. 1) must be disconnected in order to insert components in the 1300 nm path.

Figure 2:
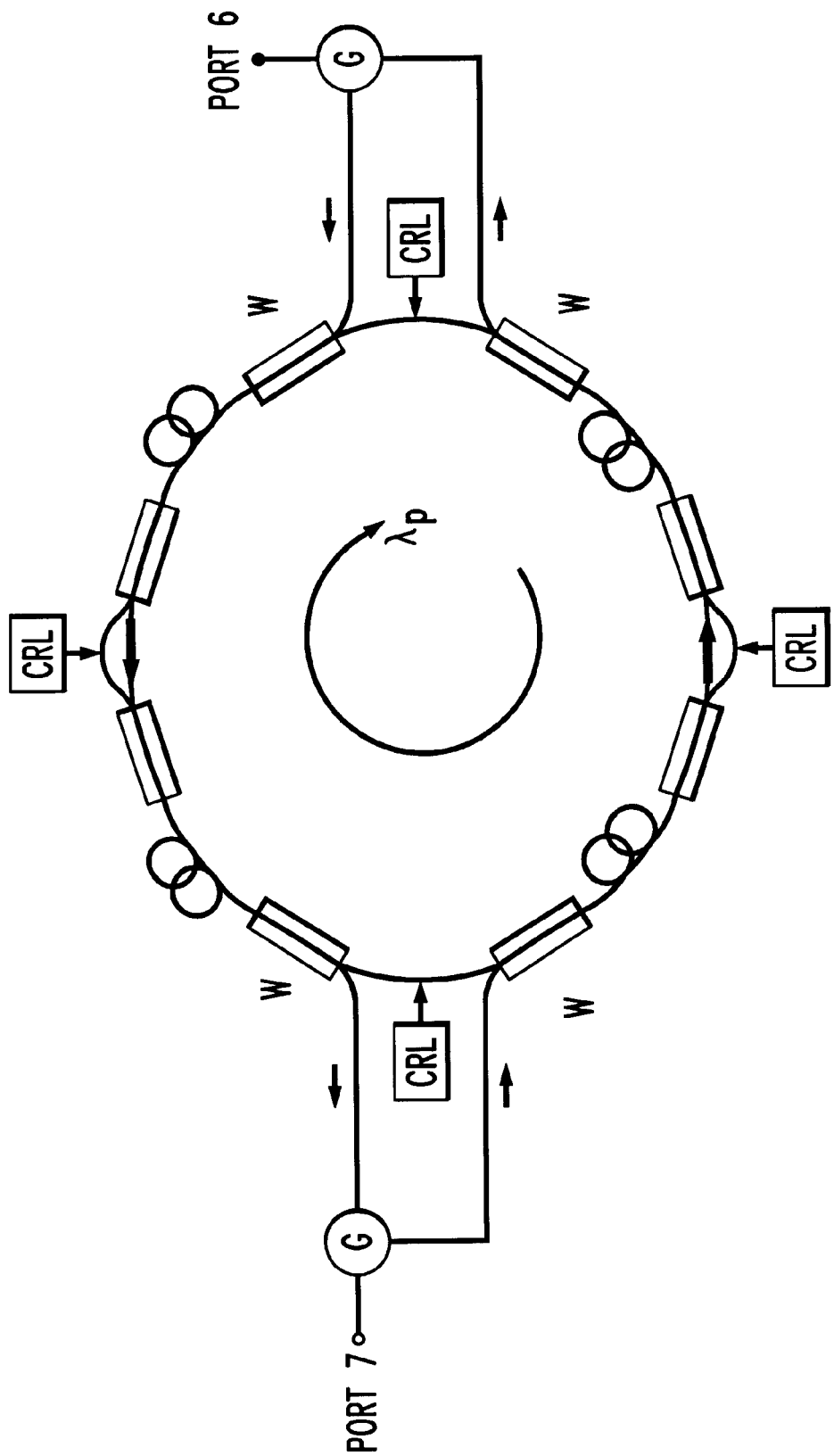
FIG. 2 is a schematic illustrating the components and configuration of second preferred embodiment of the present invention configured for bidirectional operation.

A second preferred embodiment of the present invention is shown in FIG. 2. As shown in FIG. 2, the amplifier of the present invention can also be implemented as a bidirectional amplifier. The upper half of the amplifier shown in FIG. 2 amplifies the signal going from Port 6 to Output Port 7 through Circulators G. The lower half of the amplifier provides amplification for the signal going in the other direction. Both 1300 nm and 1500 nm bi-directional amplification can be achieved by varying the number of up-conversions in the cascaded Raman laser. By using this configuration, the cascaded Raman lasers CRL, previously describe in connection with FIG. 1, can be placed in any of the four positions of shown in FIG. 2.

Although the present invention has been described in its preferred embodiments with reference to the accompanying drawings, it can be readily understood that the present invention is not restricted to the preferred embodiments and that various changes and modifications can be made by those skilled in the art without departing from the spirit and scope of the present invention.

What is claimed is:

1. An optical signal amplifier for amplifying said optical signal having at least a first and a second wavelength as it propagates therethrough, said optical signal amplifier comprising:
    a) an input port for receiving said optical signal;
    b) an output port for transmitting an amplified optical signal;
    c) an optical medium, wherein a portion of said optical medium comprises a plurality of optical paths corresponding to said at least first and second wavelengths of said optical signal for propagating said optical signal from said input port to said output port;
    d) a light radiation generator capable of coupling light radiation of a plurality of light radiation wavelengths related to said at least first and second wavelengths of said optical signal into each of said optical paths of said optical medium, whereby said at least first and said second wavelength of said optical signal are amplified by Raman amplification utilizing a single light pump source, and are separated by an integer multiple of the Stoke's shift; and
    e) an optical combiner for recombining said first and second wavelengths of said optical signal after said Raman amplification to generate said amplified optical signal and coupling said amplified optical signal to said output port.

2. The optical signal amplifier of claim 1, wherein said light radiation is propagated in a direction opposite to said propagation of said optical signal.

3. The optical signal amplifier of claim 1, further comprising an optical signal direction selective device comprising a light isolator disposed in each of said optical paths of said second portion of said optical medium for reducing scattering of said optical signal, and a bypass medium for allowing said light radiation to bypass said light isolator.

4. The optical signal amplifier of claim 1, further comprising an optical signal direction selective device comprising a light circulator disposed in each of said optical paths of said second portion of said optical medium for reducing scattering of said optical signal, and a Bragg grating for allowing said light radiation to circle said light circulator in a direction opposite to said optical signal.

5. The optical signal amplifier of claim 1, wherein said light radiation generator comprises a light pump, a light direction selection device, a light cavity and gratings, at least one wavelength division multiplexor, and a plurality of light couplers.

6. The optical signal amplifier of claim 1, further comprising gain flattening components.

7. The optical signal amplifier of claim 1, further comprising dispersion compensating components.

8. The optical signal amplifier of claim 1, further comprising an optical signal attenuator.

9. The optical signal amplifier of claim 1, further comprising an optical bypass switch in said optical paths for controllably removing one or more of said first or second wavelengths from said optical signal.

10. The optical signal amplifier of claim 1, further comprising an optical closed circulator in said optical paths for controllably removing one or more of said first or second wavelengths from said optical signal.

11. The optical signal amplifier of claim 1, wherein said first wavelength and said second wavelength of said optical signal are about 1300 nm and 1550 nm, respectively.

12. The optical signal amplifier of claim 1, wherein said optical medium comprises optical glass fiber.

13. The optical signal amplifier of claim 9, wherein said optical glass fiber is silica glass.

14. The optical signal amplifier of claim 1, wherein said optical amplifier is configured for bidirectional operation.

15. An optical signal amplifier for amplifying said optical signal having at least a first and a second wavelength as it propagates therethrough, said optical signal amplifier comprising:
    a) an input port for receiving said optical signal;
    b) an output port for transmitting an amplified optical signal;
    c) an optical medium, wherein a portion of said optical medium comprises a plurality of optical paths corresponding to said at least first and second wavelengths of said optical signal for propagating said optical signal from said input port to said output ports;
    d) a light radiation generator capable of coupling light radiation of a plurality of light radiation wavelengths related to said at least first and second wavelengths of said optical signal into each of said optical paths of said optical medium, whereby said at least first and said second wavelength of said optical signal are amplified by Raman amplification utilizing a single light pump source, and are separated by an integer multiple of the Stoke's shift;
    e) an optical signal direction selective device disposed in each of said optical paths of said second portion of said optical medium for reducing scattering of said optical signal, and a bypass medium for allowing said light radiation to bypass said optical signal direction selective device; and
    f) an optical combiner for recombining said first and second wavelengths of said optical signal after said Raman amplification to generate said amplified optical signal and coupling said amplified optical signal to said output port.

16. The optical signal amplifier of claim 15, wherein said light radiation is propagated in a direction opposite to said propagation of said optical signal.

17. The optical signal amplifier of claim 15, wherein said light radiation generator comprises a light pump, a light isolator, a light cavity and gratings, at least one wavelength division multiplexor, and a plurality of light couplers.

18. The optical signal amplifier of claim 15, further comprising gain flattening components.

19. The optical signal amplifier of claim 15, further comprising dispersion compensating components.

20. The optical signal amplifier of claim 15, further comprising an optical signal attenuator.

21. The optical signal amplifier of claim 15, further comprising an optical bypass switch in said optical paths for controllably removing one or more of said first or second wavelengths from said optical signal.

22. The optical signal amplifier of claim 15, further comprising an optical closed circulator in said optical paths for controllably removing one or more of said first or second wavelengths from said optical signal.

23. The optical signal amplifier of claim 15, wherein said optical amplifier is configured for bidirectional operation.

24. An optical signal amplifier for amplifying said optical signal having at least a first and a second wavelength as it propagates therethrough, said optical signal amplifier comprising;
 a) an input port for receiving said optical signal;
 b) an output port for transmitting an amplified optical signal;
 c) an optical medium, wherein a portion of said optical medium comprises a plurality of optical paths corresponding to said at least first and second wavelengths of said optical signal for propagating said optical signal from said input port to said output ports;
 d) a light pump, for coupling light radiation into said optical medium;
 e) a light direction selective device for propagating said light radiation in a direction opposite to said propagation of said optical signal;
 f) a wavelength converter for splitting said light radiation into a plurality of light radiation wavelengths in relation to said first and second wavelengths of said optical signal;
 g) a light divider for passing each of said plurality of wavelengths of light radiation to a corresponding one of each of said optical paths, whereby said first and said second wavelength of said optical signal are amplified by Raman amplification utilizing a single light pump source, and are separated by an integer multiple of the Stoke's shift; and
 h) an optical combiner for recombining said first and second wavelengths of said optical signal after said Raman amplification to generate said amplified optical signal and coupling said amplified optical signal to said output port.

25. The optical signal amplifier of claim 24, further comprising an optical signal direction selective device comprising a light isolator disposed in each of said optical paths of said second portion of said optical medium for reducing scattering of said optical signal, and a bypass medium for allowing said light radiation to bypass said light isolator.

26. The optical signal amplifier of claim 1, further comprising an optical signal direction selective device comprising a light circulator disposed in each of said optical paths of said second portion of said optical medium for reducing scattering of said optical signal, and a Bragg grating for allowing said light radiation to circle said light circulator in a direction opposite to said optical signal.

27. The optical signal amplifier of claim 24, wherein said wavelength converter comprises a light cavity and gratings.

28. The optical signal amplifier of claim 24, wherein said light divider comprises at least one wavelength division multiplexor and a plurality of light couplers.

29. The optical signal amplifier of claim 24, further comprising gain flattening components.

30. The optical signal amplifier of claim 24, further comprising dispersion compensating components.

31. The optical signal amplifier of claim 24, further comprising an optical signal attenuator.

32. The optical signal amplifier of claim 24, further comprising an optical bypass switch in said optical paths for controllably removing one or more of said first or second wavelengths from said optical signal.

33. The optical signal amplifier of claim 24, further comprising an optical closed circulator in said optical paths for controllably removing one or more of said first or second wavelengths from said optical signal.

34. An optical communication system comprising:
 a) an optical signal source for generating an optical signal having at least a first and a second wavelength;
 b) an optical signal amplifier in communication with said optical source for amplifying said optical signal as it propagates therethrough, said optical signal amplifier comprising:
  i) an input port for receiving said optical signal;
  ii) an output port for transmitting an amplified optical signal;
  iii) an optical medium, wherein a portion of said optical medium comprises a plurality of optical paths corresponding to said at least first and second wavelengths of said optical signal for propagating said optical signal from said input port to said output ports;
  iv) a light radiation generator capable of coupling light radiation of a plurality of light radiation wavelengths related to said at least first and second wavelengths of said optical signal into each of said optical paths of said optical medium, whereby said at least first and second wavelength of said optical signal are amplified by Raman amplification utilizing a single light pump source, and are separated by an integer multiple of the Stoke's shift; and
  v) an optical combiner for recombining said first and second wavelengths of said optical signal after said Raman amplification to generate said amplified optical signal and coupling said amplified optical signal to said output port, and
 c) an optical signal detector for detecting said amplified optical signal from said output port of said optical amplifier.

35. The optical signal amplifier of claim 34, further comprising an optical signal direction selective device comprising a light isolator disposed in each of said optical paths of said second portion of said optical medium for reducing scattering of said optical signal, and a bypass medium for allowing said light radiation to bypass said light isolator.

36. The optical signal amplifier of claim 1, further comprising an optical signal direction selective device comprising a light circulator disposed in each of said optical paths of said second portion of said optical medium for reducing scattering of said optical signal, and a Bragg grating for allowing said light radiation to circle said light circulator in a direction opposite to said optical signal.

37. The optical communication system of claim 34, wherein said light radiation generator comprises a light pump, a light direction selective device, a light cavity and gratings, at least one wavelength division multiplexor, and a plurality of light couplers.

38. The optical communication system of claim 34, further comprising gain flattening components.

39. The optical communication system of claim 34, further comprising dispersion compensating components.

40. The optical communication system of claim 34, further comprising an optical signal attenuator.

41. The optical communication system of claim 34, further comprising an optical bypass switch in said optical paths for controllably removing one or more of said first or second wavelengths from said optical signal.

42. The optical signal amplifier of claim 33, wherein said optical amplifier is configured for bidirectional operation.

* * * * *